United States Patent
Moriya et al.

(10) Patent No.: US 12,057,107 B2
(45) Date of Patent: Aug. 6, 2024

(54) MODEL LEARNING APPARATUS, METHOD AND PROGRAM

(71) Applicant: NIPPON TELEGRAPH AND TELEPHONE CORPORATION, Tokyo (JP)

(72) Inventors: Takafumi Moriya, Tokyo (JP); Yoshikazu Yamaguchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 750 days.

(21) Appl. No.: 15/734,212

(22) PCT Filed: May 20, 2019

(86) PCT No.: PCT/JP2019/019830
§ 371 (c)(1),
(2) Date: Dec. 1, 2020

(87) PCT Pub. No.: WO2019/235191
PCT Pub. Date: Dec. 12, 2019

(65) Prior Publication Data
US 2021/0225367 A1      Jul. 22, 2021

(30) Foreign Application Priority Data
Jun. 5, 2018   (JP) ................ 2018-107644

(51) Int. Cl.
*G10L 15/16* (2006.01)
*G06N 3/04* (2023.01)
(Continued)

(52) U.S. Cl.
CPC ............. *G10L 15/16* (2013.01); *G06N 3/04* (2013.01); *G06N 3/08* (2013.01); *G10L 15/063* (2013.01);
(Continued)

(58) Field of Classification Search
CPC ... G10L 15/16; G10L 15/063; G10L 15/1815; G10L 15/197; G10L 15/22; G10L 2015/0635
See application file for complete search history.

(56) References Cited

U.S. PATENT DOCUMENTS 9,202,464 B1 * 12/2015 Senior ............... G10L 15/063
9,984,682 B1 *  5/2018 Tao ................... G10L 15/183
(Continued)

FOREIGN PATENT DOCUMENTS

| JP | H01233579 A | 9/1989 |
| JP | H03157697 A | 7/1991 |
| JP | 2002324226 A | 11/2002 |

OTHER PUBLICATIONS

Ghobakhlou, Akbar, Michael Watts, and Nikola Kasabov. "Adaptive speech recognition with evolving connectionist systems." Information Sciences 156.1-2 (2003): 71-83. (Year: 2003).*

(Continued)

*Primary Examiner* — Douglas Godbold

(57) ABSTRACT

Apparatuses and methods are provided for adding a word or a character to a machine learning model for training the machine learning model. In particular, a model learning apparatus executes operations comprising adding a word or a character to be added to a neural network as a machine learning model to the output layer of the neural network. The operations further comprise calculating an output probability distribution of an output from the output layer of the neural network when a feature amount of the word or the character is input to the neural network. Given the output probability distribution and a correct feature amount of the word or the character, the operations further comprise updating a parameter of the output layer of the neural network.

20 Claims, 3 Drawing Sheets

(51) Int. Cl.
*G06N 3/08* (2023.01)
*G10L 15/06* (2013.01)
*G10L 15/18* (2013.01)
*G10L 15/197* (2013.01)
*G10L 15/22* (2006.01)

(52) U.S. Cl.
CPC ........ *G10L 15/1815* (2013.01); *G10L 15/197* (2013.01); *G10L 15/22* (2013.01); *G10L 2015/0635* (2013.01)

(56) References Cited

U.S. PATENT DOCUMENTS 10,210,860 B1* 2/2019 Ward .................. G10L 15/02
2019/0156837 A1* 5/2019 Park .................. G10L 17/18

OTHER PUBLICATIONS

Hinton et al. (2012) "Deep Neural Networks for Acoustic Modeling in Speech Recognition" IEEE Signal Processing Magazine, vol. 29, No. 6, pp. 82-97.
Soltau et al. (2017) "Neural Speech Recognizer: Acoustic-to-Word LSTM Model for Large Vocabulary SpeechRecognition" Interspeech, Aug. 20-24, 2017, Stockholm, Sweden, pp. 3707-3711.

* cited by examiner

MODEL LEARNING APPARATUS, METHOD AND PROGRAM

CROSS-REFERENCE TO RELATED APPLICATIONS

This application is a U.S. 371 Application of International Patent Application No. PCT/JP2019/019830, filed on 20 May 2019, which application claims priority to and the benefit of JP Application No. 2018-107644, filed on 5 Jun. 2018, the disclosures of which are hereby incorporated herein by reference in their entireties.

TECHNICAL FIELD

The present invention relates to a technique for learning a model used for voice recognition.

BACKGROUND ART

Referring to FIG. 1, a learning method for a typical neural network model will be described below. A method of learning a model as a neural network model for voice recognition is described in, for example, a section "TRAINING DEEP NEURAL NETWORKS" of NPL 1.

A model learning apparatus in FIG. 1 includes an intermediate-feature-amount calculation section 101, an output-probability-distribution calculation section 102, and a model update section 103.

A pair of a feature amount and a correct unit number corresponding to the feature amount and a proper initial model are prepared. The feature amount is the vector of a real number extracted in advance from each sample of learning data. The initial model may be a neural network model where a random number is allocated to each parameter or a neural network model having been already learned with another learning data.

The intermediate-feature-amount calculation section 101 calculates, from an input feature amount, an intermediate feature amount for easily identifying a correct unit in the output-probability-distribution calculation section 102. The intermediate feature amount is defined by Formula (1) of NPL 1. The calculated intermediate feature amount is output to the output-probability-distribution calculation section 102.

More specifically, on the assumption that a neural network model includes a single input layer, multiple intermediate layers, and a single output layer, the intermediate-feature-amount calculation section 101 calculates an intermediate feature amount for each of the input layer and the multiple intermediate layers. The intermediate-feature-amount calculation section 101 outputs an intermediate feature amount calculated for the last intermediate layer of the multiple intermediate layers, to the output-probability-distribution calculation section 102.

The output-probability-distribution calculation section 102 inputs the intermediate feature amount finally calculated by the intermediate-feature-amount calculation section 101, to the output layer of a current model, so that an output probability distribution including probabilities for the units of the output layer is calculated. The output probability distribution is defined by Formula (2) of NPL 1. The calculated output probability distribution is output to the model update section 103.

The model update section 103 calculates the value of a loss function based on the correct unit number and the output probability distribution and updates the model so as to reduce the value of the loss function. The loss function is defined by Formula (3) of NPL 1. The model is updated by the model update section 103 according to Formula (4) of NPL 1.

The processing of an extraction of an intermediate feature amount, a calculation of an output probability distribution, and an update of the model is repeatedly performed on each pair of a feature amount of the learning data and a correct unit number. After the processing is repeated a predetermined number of times, the model is used as a learned model. The predetermined number of times typically ranges from several tens million to several hundreds million.

In NPL 1, an output symbol is a state sharing triphone that is a finer expression than phoneme. As described in NPL 2, a voice recognition model for directly outputting the occurrence probability distribution of words from a voice feature amount has been recently used.

CITATION LIST

Non Patent Literature

[NPL 1] Geoffrey Hinton, LiDeng, Dong Yu, George E. Dahl, Abdel-rahman Mohamed, Navdeep Jaitly, Andrew Senior, Vincent Vanhoucke, Patric Nguyen, Tara N. Sainath and Brian Kingsbury, "Deep Neural Networks for Acoustic Modeling in Speech Recognition," IEEE Signal Processing Magazine, Vol. 29, No 6, pp. 82-97, 2012.

[NPL 2]: Hagen Soltau, Hank Liao, and Hasim Sak, "Neural Speech Recognizer: Acoustic-to-Word LSTM Model for Large Vocabulary Speech Recognition," INTERSPEECH, pp. 3707-3711, 2017.

SUMMARY OF THE INVENTION

Technical Problem

As described in the conventional art, in a voice recognition model where the occurrence probability distribution of words is directly output from a voice feature amount, relearning is necessary for adding a word or character. Unfortunately, the relearning needs a large amount of learning data and time, resulting in high cost.

An object of the present invention is to provide a model learning apparatus, a method, and a program that can add a word or character at lower cost than the conventional art.

Means for Solving the Problem

A model learning apparatus according to an aspect of the invention includes: a storage section in which a neural network model for voice recognition is stored; an addition section that adds a unit corresponding to a word or character to be added, to the output layer of the neural network model read from the storage section; a model calculation section that calculates an output probability distribution that is an output from the output layer when a feature amount corresponding to the word or character is input to the neural network model where the unit corresponding to the word or character is added to the output layer; and a model update section that updates the parameter of the output layer of the neural network model based on a correct unit number corresponding to the feature amount and the calculated output probability distribution.

Effects of the Invention

A word or character can be added at lower cost than the conventional art.

DESCRIPTION OF EMBODIMENTS

Figure 1:
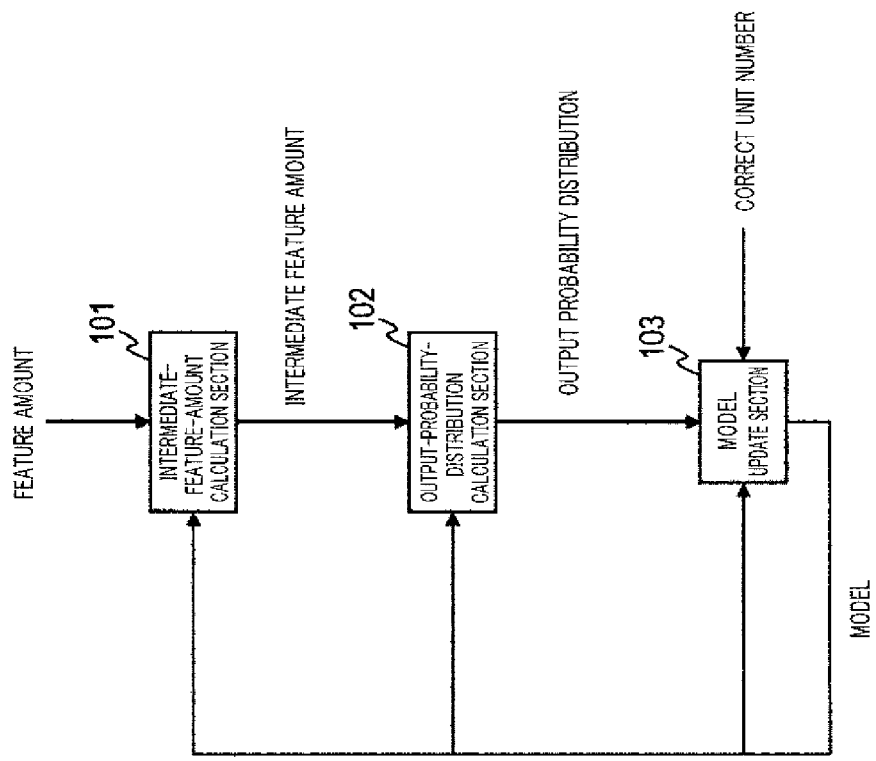
FIG. 1 illustrates an example of the functional configuration of a model learning apparatus according to NPL 1.

An embodiment of the present invention will be described below. Components having the same functions are indicated by the same numbers in the drawings and a redundant explanation is omitted.

[Model Learning Apparatus and Method]

Figure 2:
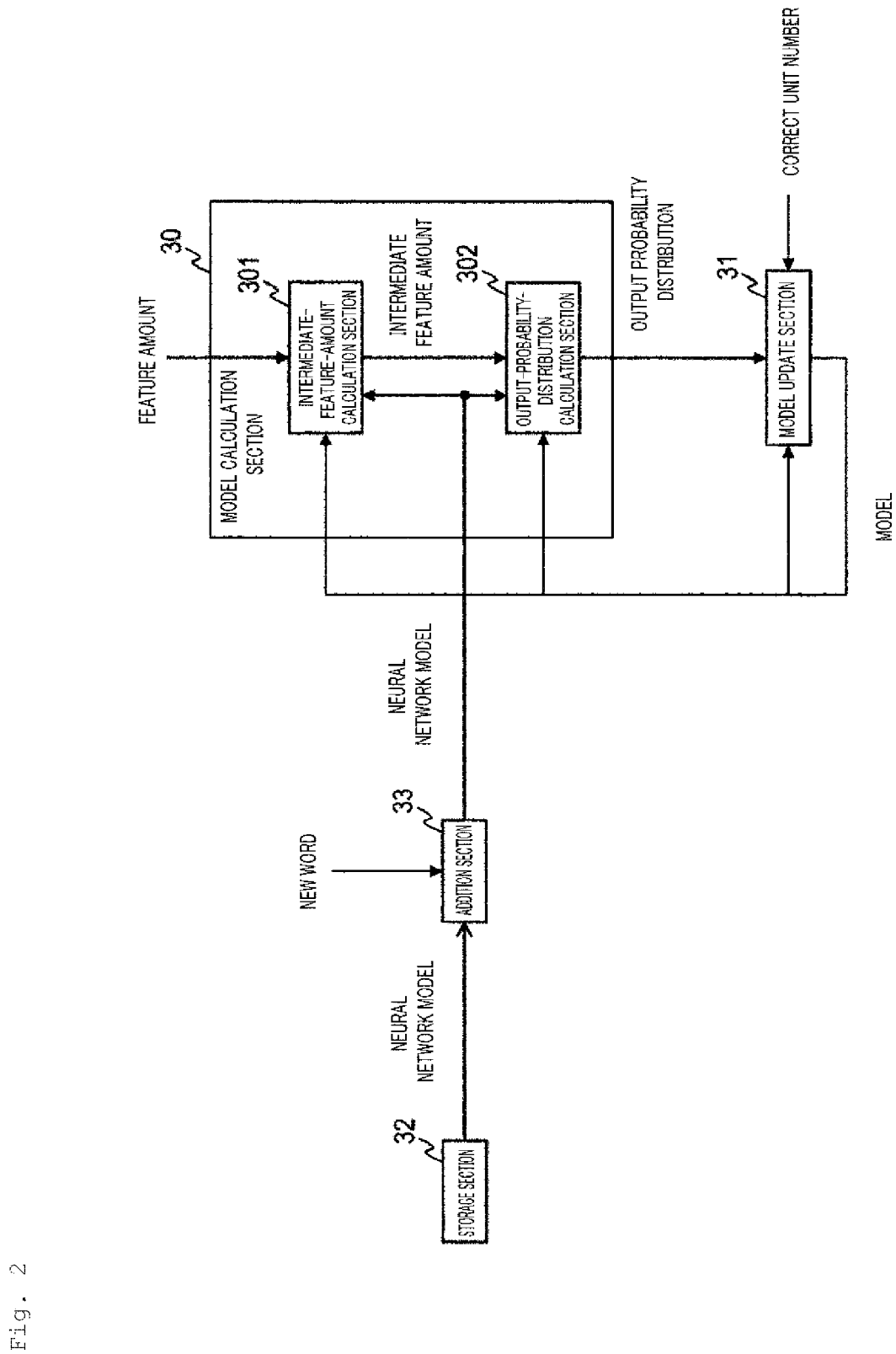
FIG. 2 illustrates an example of the functional configuration of the model learning apparatus of the invention.

As illustrated in FIG. 2, a model learning apparatus includes, for example, a model calculation section 30, a model update section 31, a storage section 32, and an addition section 33. The model calculation section 30 includes, for example, an intermediate-feature-amount calculation section 301 and an output-probability-distribution calculation section 302.

Figure 3:
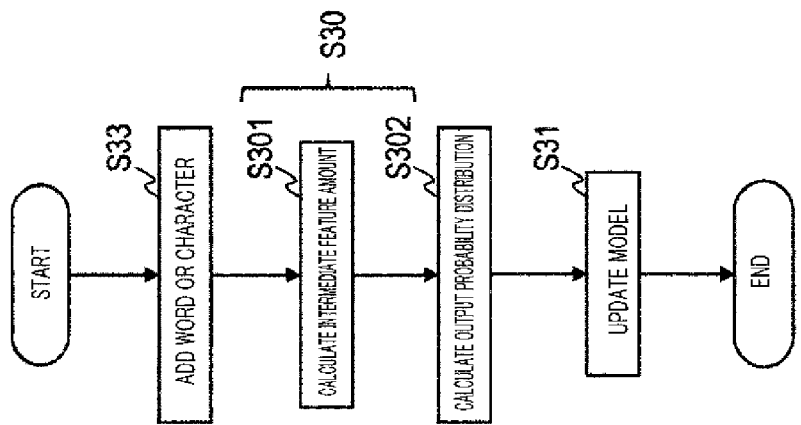
FIG. 3 illustrates an example of the procedure of a model learning method.

A model learning method is implemented by performing, for example, processing in step S33, step S30, and step S31 in FIG. 3 by the components of the model learning apparatus, the processing of which will be described below.

The components of the model learning apparatus will be described below.

<Storage Section 32>

In the storage section 32, a learned neural network model for voice recognition is stored.

<Addition Section 33>

The addition section 33 reads the neural network model from the storage section 32. Moreover, information on a word or character to be added is input to the addition section 33. Two or more words or characters may be added.

The addition section 33 adds a unit corresponding to the word or character to be added, to the output layer of the neural network model read from the storage section 32 (step S33).

The addition section 33 determines a parameter for the neural network model of the unit corresponding to the word or character to be added. The parameter is determined by, for example, a random number.

For example, if the output layer of the neural network model learned and read from the storage section 32 includes $N_1$ units and $N_2$ words or characters are to be added, $N_2$ units are added to the output layer, so that the output layer includes $N_1+N_2$ units in total.

An input layer and intermediate layers in the neural network model including the units read from the storage section 32 are left unchanged. However, an intermediate feature amount calculated from the last intermediate layer is input to the added units of the output layer.

The neural network model, in which the units are added to the output layer, is output to the model calculation section 30.

The addition section 33 may discard all existing units in the output layer and the output layer may only include units corresponding to words or characters to be added. This can generate a neural network model specific to a new domain.

The domain means a linguistic domain for speeches in, for example, speech retrieval, a natural speech, a diet speech, and a conversation and subjects (topics).

<Model Calculation Section 30>

The model calculation section 30 receives the neural network model where a unit corresponding to a word or character is added to the output layer by the addition section 33 and a feature amount corresponding to the word or character to be added.

The model calculation section 30 calculates an output probability distribution of an output from the output layer when the feature amount corresponding to the word or character to be added is input to the neural network model where the unit corresponding to the word or character to be added is added to the output layer (step S30).

The calculated output probability distribution is output to the model update section 31.

For a specific explanation of the processing of the model calculation section 30, the intermediate-feature-amount calculation section 301 and the output-probability-distribution calculation section 302 of the model calculation section 30 will be described below.

The processing of the intermediate-feature-amount calculation section 301 and the output-probability-distribution calculation section 302 is performed on a feature amount corresponding to a word or character to be added. This obtains an output probability distribution for the feature amount corresponding to the word or character to be added.

<<Intermediate-Feature-Amount Calculation Section 301>>

The intermediate-feature-amount calculation section 301 performs the same processing as the intermediate-feature-amount calculation section 101.

The intermediate-feature-amount calculation section 301 receives a feature amount.

The intermediate-feature-amount calculation section 301 generates an intermediate feature amount by using the input feature amount and the neural network model (step S301). The intermediate feature amount is defined by, for example, Formula (1) of NPL 1.

The calculated intermediate feature amount is output to the output-probability-distribution calculation section 302.

From the input feature amount and the current model, the intermediate-feature-amount calculation section 301 calculates an intermediate feature amount for easily identifying a correct unit in the output-probability-distribution calculation section 302. Specifically, on the assumption that the neural network model as a current model includes a single input layer, multiple intermediate layers, and a single output layer, the intermediate-feature-amount calculation section 301 calculates an intermediate feature amount for each of the input layer and the multiple intermediate layers. The intermediate-feature-amount calculation section 301 outputs, to the output-probability-distribution calculation section 302, an intermediate feature amount calculated for the last intermediate layer of the intermediate layers.

When the intermediate-feature-amount calculation section 301 performs the processing for the first time, the current model is a neural network model where a unit corresponding to a word or character to be added is added to the output layer. If the intermediate-feature-amount calculation section 301 performs the processing k times, the current model is a neural network model generated by the k−1th processing of the model learning apparatus and method, where k is a positive integer of at least 2.

<<Output-Probability-Distribution Calculation Section 302>>

The output-probability-distribution calculation section 302 performs the same processing as the output-probability-distribution calculation section 102.

The output-probability-distribution calculation section 302 receives the intermediate feature amount calculated by the intermediate-feature-amount calculation section 301.

The output-probability-distribution calculation section 302 inputs the intermediate feature amount finally calculated by the intermediate-feature-amount calculation section 301, to the output layer of the current model, so that an output probability distribution including probabilities for the units of the output layer is calculated (step S302). The output probability distribution is defined by, for example, Formula (2) of NPL 1.

The calculated output probability distribution is output to the model update section 31.

If the input feature amount is a voice feature amount and the model is an acoustic model of a neural network for voice recognition, the output-probability-distribution calculation section 302 calculates a speech output symbol (phonemic state) for an intermediate feature amount that is a positively identifiable speech feature amount. In other words, an output probability distribution corresponding to the input feature amount is obtained.

<Model Update Section 31>

The model update section 31 receives a correct unit number corresponding to the feature amount and the output probability distribution corresponding to the feature amount calculated by the model calculation section 30.

The model update section 31 updates the parameter of the output layer of the neural network model based on the correct unit number corresponding to the feature amount and the calculated output probability distribution (step S31). The model update section 31 does not update the parameters of the input layer and the intermediate layers of the neural network model.

The model update section 31 updates the parameter of the output layer of the neural network model so as to minimize the value of a loss function that is calculated based on the correct unit number corresponding to the feature amount and the output probability distribution corresponding to the feature amount.

The loss function is defined by, for example, Formula (3) of NPL 1. The model is updated by the model update section 31 according to, for example, Formula (4) of NPL 1. Parameters in the model to be updated include, for example, weight w and bias b of Formula (1) of NPL 1.

The updated neural network model is output to the intermediate-feature-amount calculation section 301 and the output-probability-distribution calculation section 302.

As described above, only the parameter of the output layer of the neural network model is updated and learned parameters are used for the input layer and the intermediate layers. This achieves learning of the neural network model with only a small amount of learning data on words or characters to be added. Thus, a word or character can be added at lower cost than the conventional art.

[Modification]

A specific configuration is not limited to the foregoing embodiments of the invention. Obviously, the invention includes any changes of the design within the scope of the invention.

The processing described in the embodiments is performed in time sequence in the order of description. Alternatively, the processing may be performed in parallel or separately according to the capacity of a processing section or as necessary.

[Program, Recording Medium]

If the processing functions of the foregoing apparatuses are implemented by a computer, the processing contents of functions to be provided for the apparatuses are described by a program. The program running on the computer implements the processing functions of the apparatuses.

The program that describes the processing contents can be recorded in a computer-readable recording medium. The computer-readable recording medium may be, for example, a magnetic recording device, an optical disk, a magneto-optic recording medium, or a semiconductor memory.

The program is distributed by, for example, selling, granting, or lending portable recording media such as a DVD and a CD-ROM for recording the program. Moreover, the program may be distributed such that the program stored in the storage device of a server computer is transferred from the server computer to another computer via a network.

For example, the computer for running the program initially stores, temporarily in the storage device of the computer, the program recorded in a portable recording medium or the program transferred from the server computer. After the processing is executed, the computer reads the program stored in the storage device and performs processing according to the read program. As another pattern of execution of the program, the computer may directly read the program from the portable recording medium and perform processing according to the program. Furthermore, the computer may perform processing according to the received program each time the program is transferred from the server computer to the computer. Alternatively, the processing may be executed by so-called ASP (Application Service Provider) service in which processing functions are implemented only by an instruction of execution and the acquisition of a result without transferring the program to the computer from the server computer. The program of the present embodiment includes information that is used for processing by an electronic calculator and is equivalent to the program (for example, data is not a direct command to the computer but has the property of specifying the processing of the computer).

In the present embodiment, the apparatus is configured such that the predetermined program runs on the computer. At least part of the processing contents may be implemented by hardware.

REFERENCE SIGNS LIST

101 Intermediate-feature-amount calculation section
102 Output-probability-distribution calculation section
103 Model update section
30 Model calculation section
301 Intermediate-feature-amount calculation section
302 Output-probability-distribution calculation section
31 Model update section
32 Storage section
33 Addition section

The invention claimed is:

1. A model learning apparatus comprising a processor configured to execute operations comprising:

storing a neural network model for voice recognition in a data store, wherein the neural network model includes an output layer of a plurality of layers of parameters;

appending unit data representing a word to an output layer of the neural network model retrieved from the data store;

determining an output probability distribution, wherein the output probability distribution represents a probability distribution of the output layer of the plurality of layers of the neural network model, and the output probability distribution is based on a feature amount of the word as input to the neural network model with the appended unit data for outputting the word as output;

calculating an intermediate feature amount for each of an intermediate layer among a plurality of intermediate layers;

outputting the intermediate feature amount calculated for a last layer among the plurality of intermediate layers to determine correct unit data for the intermediate feature amount; and updating, based on the correct unit data of the intermediate feature amount for training and the determined output probability distribution data, a parameter of the output layer of the neural network model to train the neural network model as a machine learning model.

2. The model learning apparatus of claim 1, wherein the plurality of layers include an input layer, an intermediate layer, and the output layer, each layer includes a plurality of unit data, and one or more of the plurality of unit data represent characters.

3. The model learning apparatus of claim 1, the processor further configured to execute operations comprising:
deleting one or more unit data from the output layer of the neural network model of a first domain to generate another neural network model specific to a second domain, wherein the first domain and the second domain are distinct, and the first domain includes a linguistic domain associated with a topic from at least one of:
a speech search,
a natural speech,
a speech from a meeting, or
a conversation.

4. The model learning apparatus of claim 1, the processor further configured to execute operations comprising:
generating, based on an input feature amount and the neural network model, the intermediate feature amount.

5. The model learning apparatus of claim 1, wherein the neural network includes the word or characters appended as training data to the output layer, and the neural network includes previously learnt parameters in an input layer and one or more intermediate layers.

6. The model learning apparatus of claim 1, wherein the updated parameter of the output layer of the neural network model minimizes a value of a loss function.

7. The model learning apparatus of claim 1, wherein the parameter represents a weight value in a layer of the neural network model.

8. The model learning apparatus claim 1, wherein the unit data comprise the word or a character as addition data to perform the voice recognition.

9. The model learning apparatus according to claim 1, wherein the updating further comprises updating the parameter of the output layer of the neural network model without updating a parameter of an intermediate layer of the neural network model.

10. A computer-implemented method for training a neural network model for voice recognition, the method comprising:

appending unit data representing a word to an output layer of the neural network model received retrieved from a data store;

determining an output probability distribution, wherein the output probability distribution represents a probability distribution of the output layer of the plurality of layers of the neural network model, and the output probability distribution is based on a feature amount of the word as input to the neural network model with the appended unit data for outputting the word as output;

calculating an intermediate feature amount for each of an intermediate layer among a plurality of intermediate layers;

outputting the intermediate feature amount calculated for a last layer among the plurality of intermediate lavers to determine correct unit data for the feature amount; and updating, based on the correct unit data of the intermediate feature amount for training the neural network model and the determined output probability distribution data, a parameter of the output layer of the neural network model to train the neural network model as a machine learning model.

11. The computer-implemented method of claim 10, wherein the plurality of layers include an input layer, an intermediate layer, and the output layer, each layer includes a plurality of unit data, and one or more of the plurality of unit data represent at least a character.

12. The computer-implemented method of claim 10, the method further comprising:
deleting one or more unit data from the output layer of the neural network model of a first domain to generate another neural network model specific to a second domain, wherein the first domain and the second domain are distinct, and the first domain includes a linguistic domain associated with a topic from at least one of:
a speech search,
a natural speech,
a speech from a meeting, or
a conversation.

13. The computer-implemented method of claim 10, the method further comprising:
generating, based on an input feature amount and the neural network model, the intermediate feature amount, wherein the intermediate feature amount corresponds to an intermediate layer of the neural network model.

14. The computer-implemented method of claim 10, wherein the neural network includes the word appended as training data to the output layer, and the neural network includes previously learnt parameters in an input layer and one or more intermediate layers.

15. The computer-implemented method of claim 10, wherein the updated parameter of the output layer of the neural network model minimizes a value of a loss function.

16. The computer-implemented method of claim 10, wherein the parameter represents a weight value in a layer of the neural network model.

17. The computer-implemented method of claim 10, wherein the unit data comprise the word or a character as addition data to perform the voice recognition.

18. A computer-readable non-transitory recording medium storing computer-executable program instructions that when executed by a processor cause a computer to execute operations comprising:

storing a neural model for voice recognition, wherein the neural network model includes an output layer of a plurality of layers of parameters;

appending unit data representing a word to an output layer of the neural network model retrieved from the data store;

determining an output probability distribution, wherein the output probability distribution represents a probability distribution of the output layer of the plurality of layers of the neural network model, and the output probability distribution is based on a feature amount of the word as input to the neural network model with the appended unit data for outputting the word as output;

calculating an intermediate feature amount for each of an intermediate layer among a plurality of intermediate layers;

outputting the intermediate feature amount calculated for a last layer among the plurality of intermediate layers to determine correct unit data for the feature amount; and updating, based on the correct unit data of the intermediate feature amount for training and the determining output probability distribution data, a parameter of the output layer of the neural network model to train the neural network model as a machine learning model.

19. The computer-readable non-transitory recording medium of claim 18, wherein the plurality of layers include an input layer, an intermediate layer, and the output layer, each layer includes a plurality of unit data, and one or more of the plurality of unit data represent at least a character.

20. The computer-readable non-transitory recording medium of claim 18, the computer-executable program instructions when executed by the processor further cause executing operations comprising:

deleting one or more unit data from the output layer of the neural network model of a first domain to generate another neural network model specific to a second domain, wherein the first domain and the second domain are distinct, and the first domain includes a linguistic domain associated with a topic from at least one of:

a speech search,
a natural speech,
a speech from a meeting, or
a conversation.

* * * * *